United States Patent [19]

Kamei et al.

[11] Patent Number: 4,611,253
[45] Date of Patent: Sep. 9, 1986

[54] MAGNETIC RECORDING AND REPRODUCING DEVICE

[75] Inventors: Kazuo Kamei; Toshiharu Iida, both of Saitama, Japan

[73] Assignee: Pioneer Electronic Corporation, Tokyo, Japan

[21] Appl. No.: 625,141

[22] Filed: Jun. 27, 1984

[30] Foreign Application Priority Data

Jun. 28, 1983 [JP] Japan ............................ 59-99852[U]
Jun. 28, 1983 [JP] Japan ............................ 59-116669

[51] Int. Cl.⁴ ............................ G11B 5/03; G11B 5/02
[52] U.S. Cl. ........................................ 360/66; 360/25
[58] Field of Search ....................... 360/65, 66, 67, 68, 360/31, 25

[56] References Cited

U.S. PATENT DOCUMENTS

4,297,730 10/1981 Kadowaki et al. .................. 360/66
4,422,109 12/1983 Sampei et al. ........................ 360/66

Primary Examiner—Vincent P. Canney
Attorney, Agent, or Firm—Sughrue, Mion, Zinn, Macpeak, and Seas

[57] ABSTRACT

A magnetic recording and reproducing device in which an optimum recording bias current, optimum recording level and optimum recording equalization characteristic are automatically set wherein a desired MOL balance dependent upon a difference of a magnetic characteristic is achieved. A recording bias is varied at predetermined time intervals. A variable low-frequency oscillator supplies a low-frequency signal upon which the recording bias current is superposed for recording upon a magnetic medium. The maximum value of a reproduced signal of the recorded signal is detected and the recording bias current set to supply an optimum recording bias current corresponding to the maximum value of the reproduced signal. The low-frequency oscillator is set to oscillate at an optimum frequency dependent upon at least one of the type of the magnetic medium and a magnetic characteristic thereof.

8 Claims, 13 Drawing Figures

MAGNETIC RECORDING AND REPRODUCING DEVICE

BACKGROUND OF THE INVENTION

The present invention relates to a magnetic recording and reproducing device in which an optimum recording bias current, optimum recording level and optimum recording equalization characteristic are automatically set.

A magnetic recording and reproducing device in which an optimum recording bias current, optimum recording level and optimum recording equalization characteristic are automatically set is described, for example, in Japanese Patent Application No. 79/116,206 (OPI). To set the optimum recording bias current, a recording bias current is varied at arbitrary time intervals, reference recording/reproducing signals corresponding to the bias current thus varied are stored, a maximum value of the stored signals is detected, and the bias current is fixed at the value corresponding to the maximum reference recording/reproducing signal. To set the optimum recording level, a recording level of a signal in a low-frequency range is varied at arbitrary time intervals, reference recording/reproducing signals corresponding to the recording level thus varied are compared with a reference level, and the recording level is fixed at the value at which the level of the reference recording/reproducing signal is equal to that of the reference value. Finally, to set the optimum recording equalization characteristic, a recording equalization characteristic is varied at arbitrary time intervals, reference recording/reproducing signals corresponding to the recording equalization characteristic thus varied are compared with a reference level, and the recording equalization characteristic is fixed at the value at which the reference recording/reproducing signal equal to the reference level is obtained.

The construction of the magnetic recording and reproducing device described above is shown in FIG. 1. The operation of the device of FIG. 1 will be described in accordance with the flowchart shown in FIG. 2.

Figure 1:
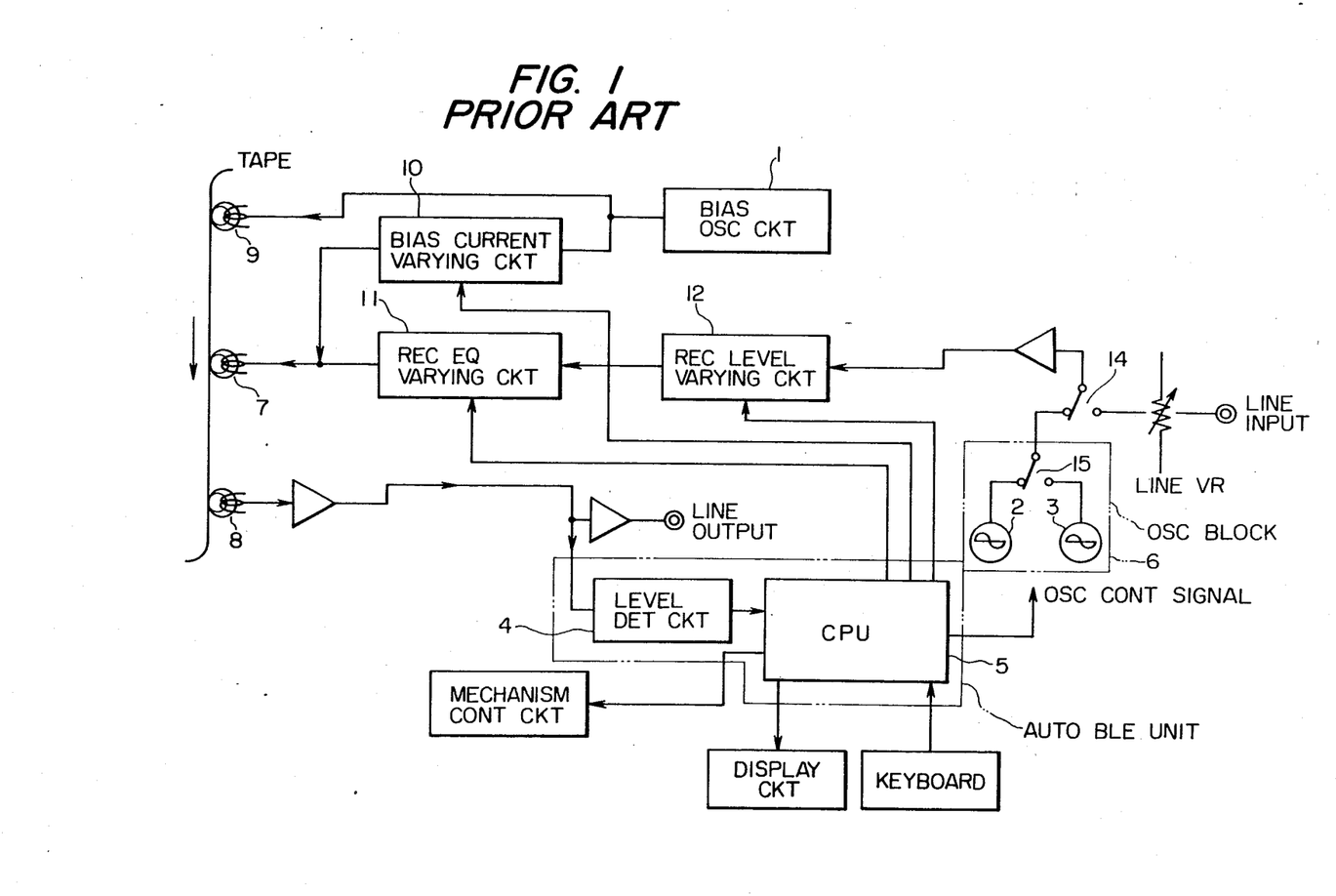
FIG. 1 is a circuit diagram of a conventional magnetic recording and reproducing device.
Figure 2:
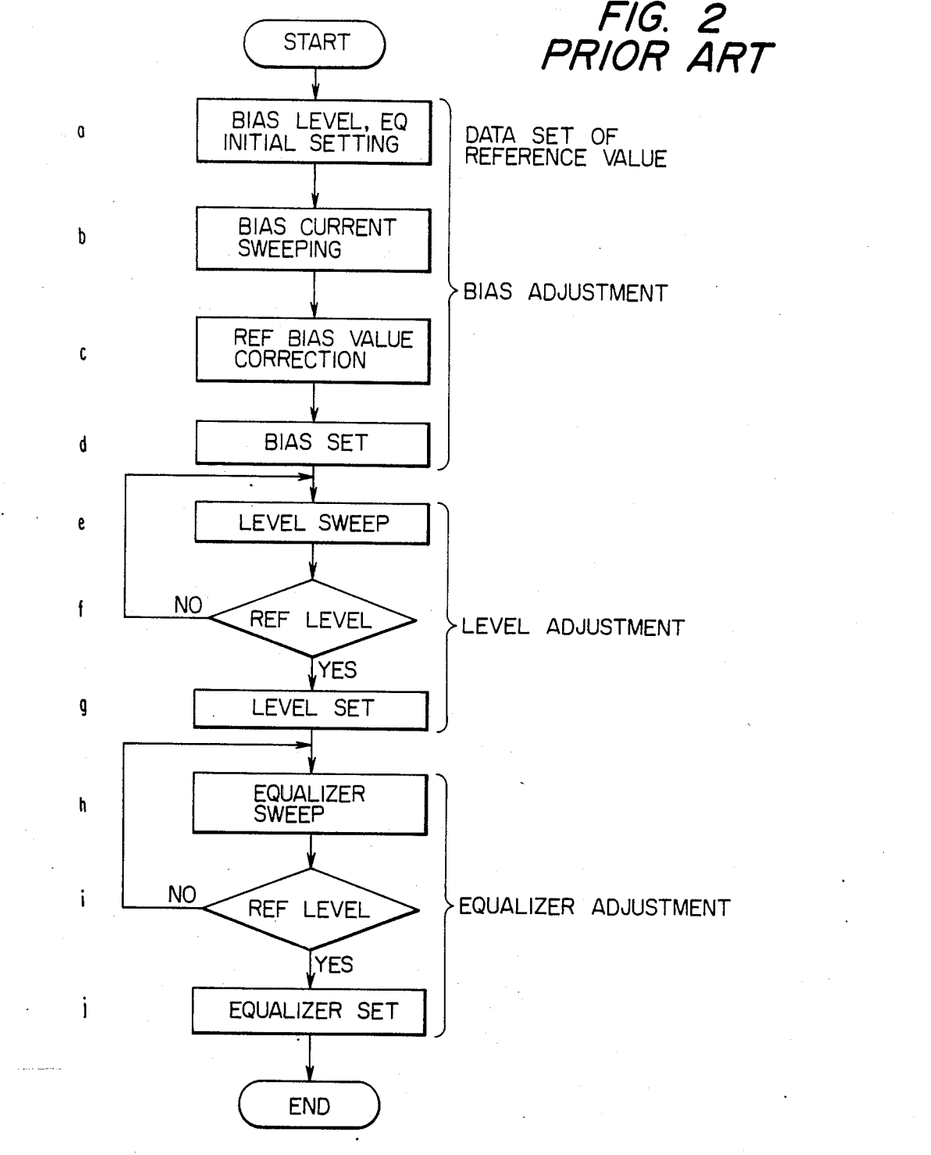
FIG. 2 is a flowchart used to explain the operation of the device of FIG. 1.

Under the control of a CPU (Central Processing Unit) 5, a bias current varying circuit 10 gradually increases a bias current supplied from a bias oscillation circuit 1 to a recording head 7. The CPU 5 also drives switches 15 and 14 to supply a signal of a low frequency, for example, a frequency of 333 Hz, produced by a low-frequency oscillator 2 through switches 15 and 14, a recording level varying circuit 12 and a recording equalizer varying circuit 11 to the recording head 7. A signal produced by superposing the bias current on the low-frequency signal is recorded on the magnetic tape by the recording head 7. The recorded signal is reproduced from the magnetic tape by a reproducing head 8. The level of the reproduced signal is detected by a reproduced level detecting circuit 4. The maximum value of the detected reproduced level is determined by the CPU 5, which in turn sets the bias current varying circuit 10 to output the optimum bias current of the value at which the maximum reproduced level is obtained. These operations are shown by steps a–d in the flowchart of FIG. 2.

Also under the control of the CPU 5, the recording level varying circuit 12 increases the amplitude of the low-frequency signal supplied to the recording head 7. The signal thus recorded on the magnetic tape is reproduced by the reproducing head 8. The level of the reproduced signal is then detected by the reproduced level detecting circuit 4. The CPU 5 sets the recording level varying circuit 12 to output the recording level at which the reproduced level detected by the reproduced level detecting circuit 4 becomes equal to a reference level. These operations are shown by steps e, f, and g in the flowchart of FIG. 2.

Finally, the switch 15 is driven by the CPU 5 to supply a high-frequency signal of 10 kHz produced by a high-frequency oscillator 3 to the recording equalizer circuit 11 through the recording level varying circuit 12. Also under the control of the CPU 5, the recording equalizer varying circuit 11 gradually increases the amplitude of the high-frequency signal of 10 kHz supplied to the recording head 7. The high-frequency signal thus recorded on the magnetic tape is reproduced by the reproducing head 8. The level of the reproduced signal is detected by the reproduced level detecting circuit 4. The CPU 5 finally sets the recording equalizer varying circuit 11 to output the high-frequency signal of the amplitude at which the reproduced level detected by the reproduced level detecting circuit 4 is equal to a reference level. These operations are shown by steps h, i, and j of the flowchart of FIG. 2.

According to the conventional magnetic recording and reproducing circuit as described above, the bias current, the recording level and the recording equalization characteristic can be set to respective optimum values. However, since the oscillation frequency of the low-frequency oscillator 2 for detecting reference recording/reproducing signals is fixed, it is impossible for the recording head to operate under a bias current other than the optimum bias current set using the fixed low frequency. Therefore, while the frequency response can be made flat by the compensation of the bias current, it is difficult to keep a balance of MOLs (maximum output levels) between a middle- and low-frequency range and a high-frequency range.

SUMMARY OF THE INVENTION

Accordingly, it is an object of the present invention to overcome this difficulty accompanying the conventional device and to provide a magnetic recording and reproducing device which can set an optimum recording bias current in which a desired MOL balance, dependent upon the magnetic characteristics of the tape being used, is obtained.

The object mentioned above is achieved by a magnetic recording and reproducing device of the present invention which comprises means for varying a recording bias current at arbitrary time intervals, a variable low-frequency oscillator for supplying a low-frequency signal upon which the recording bias current is superposed to be magnetically recorded, means for detecting a maximum value of reference recording/reproducing signals corresponding to the bias current thus varied and setting the recording bias current varying means to supply an optimum recording bias current corresponding to a maximum value of the reference recording/reproducing signals, and means for controlling the variable low-frequency oscillator to oscillate at an optimum frequency dependent upon a type or magnetic characteristic of the magnetic medium being used.

BRIEF DESCRIPTION OF THE DRAWINGS

Still other objects and features of the present invention will be apparent from the following description accompanied by the drawings wherein.

DESCRIPTION OF THE PREFERRED EMBODIMENTS

Figure 3:
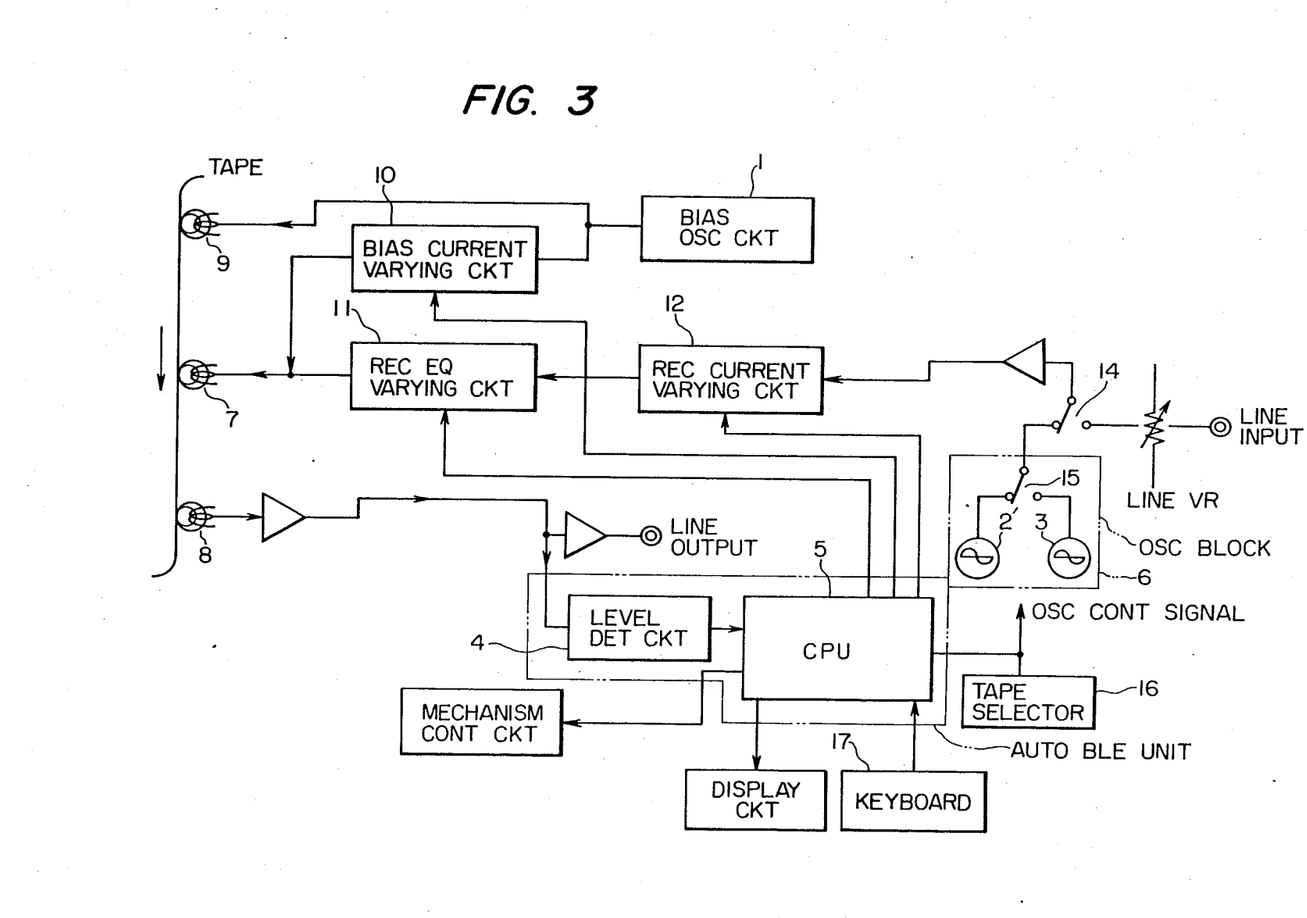
FIG. 3 is a circuit diagram of a preferred embodiment of the invention.

In the magnetic recording and reproducing device of the invention shown in FIG. 3, a variable low-frequency oscillator 2' of a variable oscillation frequency is included instead of the low-frequency oscillator in the conventional magnetic recording and reproducing device shown in FIG. 1. The low-frequency oscillator 2' is controlled by a CPU 5 to start and stop oscillation. The oscillation frequency of the oscillator 2' is also controlled through the CPU 5, which receives instructions from a keyboard 17 or controlled directly by an output from a tape selecting switch 16. Other elements identified by common reference numerals in FIG. 1 are the same as in the device of FIG. 1.

The operation of the device of FIG. 3 constructed as described above will now be described. As shown by the steps a and b in the flowchart of FIG. 2, the bias current varying circuit 10 gradually increases a bias current supplied from a bias oscillation circuit 1 to the recording head 7 under the control of the CPU 5. The CPU 5 also drives the switches 15 and 14 to supply a low-frequency signal from the low-frequency oscillator 2' through the switches 15 and 14, the recording level varying circuit 12 and the recording equalizer varying circuit 11 to the recording head 7. A signal produced by superposing the bias current on the low-frequency signal is recorded on a magnetic tape by the recording head 7. The recorded signal is then reproduced by the reproducing head 8. The level of the reproduced signal is detected by the reproduced level detecting circuit 4. The maximum value of the detected reproduced level is detected by the CPU 5, which in turn sets the bias current varying circuit 10 to output an optimum bias current of the value at which the maximum reproduced level is obtained.

In these operations, the tape selecting switch 16 is switched to the normal tape side, if a "normal" magnetic tape is used, to thus set the output frequency of the low-frequency oscillator 2' at about 315 Hz. On the other hand, if a "metal" magnetic tape is used, the tape selecting switch 16 is switched to the metal magnetic tape side to thus set the output frequency of the low-frequency oscillator 2' at about 250 Hz.

Generally, the optimum value of the bias current is set so that the maximum reproduced level is obtained as described above. However, the optimum value of the bias current is preferably set so that the difference of MOLs between 315 Hz and 10 kHz is 12 dB in the case of a normal tape and 6 dB in the case of a metal tape.

Figure 4:
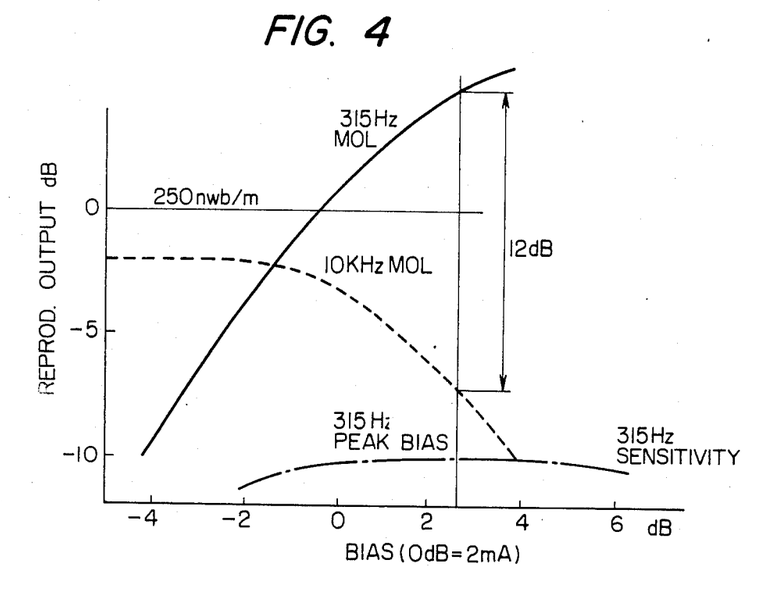
FIGS. 4 and 5 are characteristic diagrams used to explain the operation of the device of FIG. 3.
Figure 5:
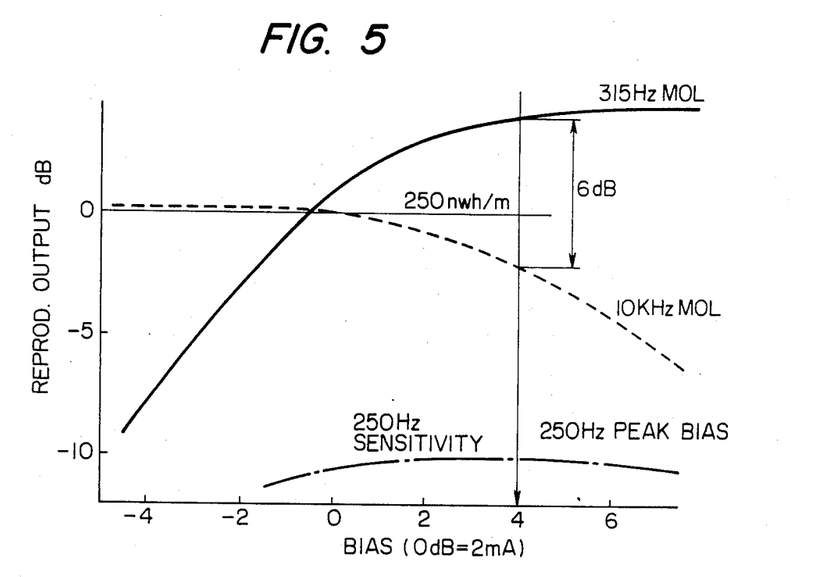

In the case of a normal tape, the difference of MOLs between 315 Hz and 10 kHz equal to 12 dB is obtained under the bias current at which the maximum value of the reproduced signal of 315 Hz is also obtained, as shown in FIG. 4. On the other hand, in the case of a metal tape, the difference of MOLs between 315 Hz and 10 kHz equal to 6 dB is obtained under the bias current at which the maximum value of the reproduced signal of 250 Hz is also obtained, as shown in FIG. 5.

In the magnetic recording and reproducing device according to this embodiment of the invention, the optimum bias current is set by using a signal of 315 Hz supplied from the variable low-frequency oscillator 2' when a normal tape is used. On the other hand, if a metal tape is used, the optimum bias current is set by using a signal of 250 Hz supplied from the variable low-frequency oscillator 2'. As a result, the optimum bias current is set so that the differences of MOLs between 315 Hz and 10 kHz is 12 dB and 6 dB for the normal tape and metal tape, respectively. In this manner, the MOL balance is adjusted by setting the bias current at which the maximum reproduced level is obtained.

A modification may be made in which instructions provided from the tape selecting switch 16 are first stored in the CPU 5, and the oscillation frequency of the variable low-frequency oscillator 2' is switched in response to the stored instructions. Still another construction may be utilized in which the CPU 5 is provided with information indicative of the type of tape being used from the keyboard 17 instead of the tape selecting switch.

According to the embodiment of the invention described above, the oscillation frequency of the low-frequency oscillator for optimizing the bias current is changed depending on the type of the magnetic tape used. An optimum bias current can be set to the value at which the MOL balance between the middle- and low-frequency range and the high-frequency range is obtained depending upon the type of tape used.

The construction of the device of the invention is simple since the oscillation frequency of the low-frequency oscillator is simply switched depending on the type of magnetic tape used. Therefore, only small changes are required in the conventional magnetic recording and reproducing device to implement the invention.

Another embodiment of the invention will be described by referring to FIGS. 6A and 6B.

Figure 6A:
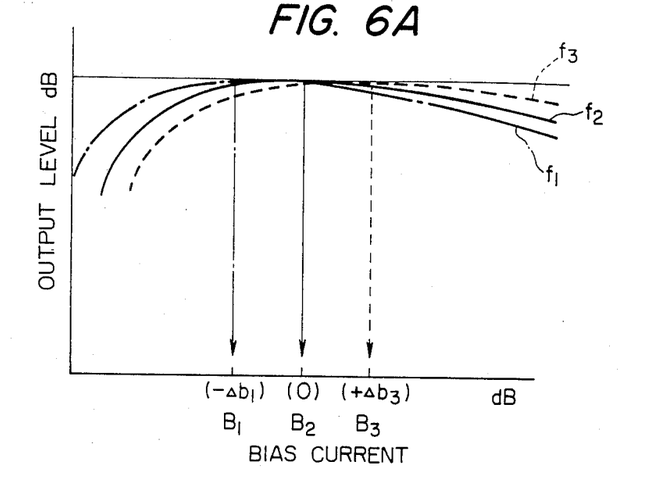
FIGS. 6A and 6B are characteristic diagrams used to explain the operation of another embodiment of the invention.

FIG. 6A shows the relations between the bias current and corresponding reproduced level for frequencies $f_1$, $f_2$ and $f_3$ ($f_1 < f_2 < f_3$). The bias current at which the maximum reproduced level is obtained (hereinafter referred to as the "peak bias") is $B_1$ for frequency $f_1$, $B_2$ for frequency $f_2$ and $B_3$ for frequency $f_3$. As the frequency becomes lower, the sensitivity curve becomes broader and the peak bias becomes lower so that $B_1 < B_2 < B_3$.

By considering $B_2$, as a standard value, to be 0 dB, the peak biases $B_1$ and $B_3$ are $-\Delta b_1$ dB and $+\Delta b_3$ dB, respectively.

Figure 6B:
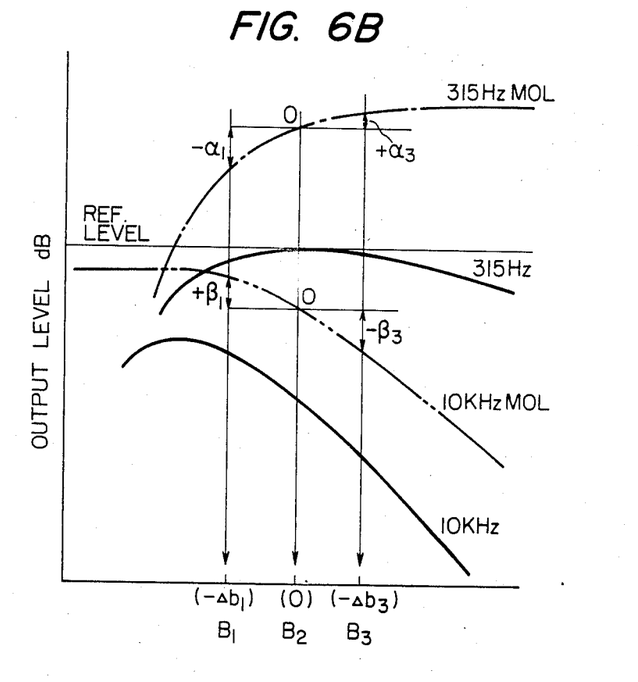

General sensitivity curves of magnetic tapes are shown in FIG. 6B. The 315 Hz MOL and the 10 kHz MOL at $B_1$ ($-\Delta b_1$ dB) and $B_3$ ($+\Delta b_3$ dB) are set to ($-\alpha_1$ dB, $+\beta_1$ dB) and ($+\alpha_3$ dB, $-\beta_3$ dB), respectively, by setting corresponding values to be 0 dB at $B_2$ (0 dB). The 315 Hz MOL at the peak bias for frequency $f_1$ is lower by $\alpha_1$ dB than the 315 Hz MOL at the standard peak bias for frequency $f_2$. On the other hand, the 10 kHz MOL at the peak bias for frequency $f_1$ is higher by $\beta_1$ dB than the 10 kHz MOL in the standard peak bias for frequency $f_2$. Also, the 315 Hz MOL at the peak bias for frequency $f_3$ is higher by $\beta_3$ dB than the standard peak bias for frequency $f_2$, and the 10 kHz MOL at the former is lower by $\beta_3$ dB than the 10 kHz MOL at the latter. Accordingly, the MOL balance between the high-frequency range and the middle- and low-frequency range can be set to an arbitrary value by varying the oscillation frequency of the variable low-frequency oscillator 2'.

According to another preferred embodiment of the invention, the MOL balance between the high-frequency range and the middle- and low-frequency range is set to a desired value depending upon the type of sound to be recorded and reproduced by setting the oscillation frequency of the variable low-frequency oscillator 2'.

Under the condition $f_1 < f_2 < f_3$ as described above, the oscillation frequency F of the variable low-frequency oscillator 2' is set to satisfy $f_1 \leq F \leq f_2$ when the MOL at the high-frequency range is desired to be high. On the other hand, when the MOL at the middle- and low-frequency range is desired to be high, the oscillation frequency F is set to satisfy $f_2 \leq F \leq f_3$. In this manner, the MOL balance can be adjusted by selecting the low frequency used for optimizing the bias current.

Figure 7A:
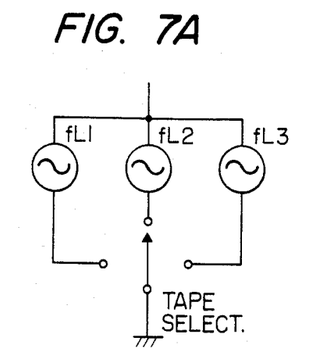
FIGS. 7A through 7F are diagrams of various circuit implementations of switches shown in FIG. 3.
Figure 7B:
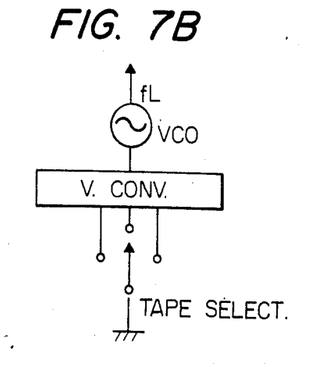
Figure 7C:
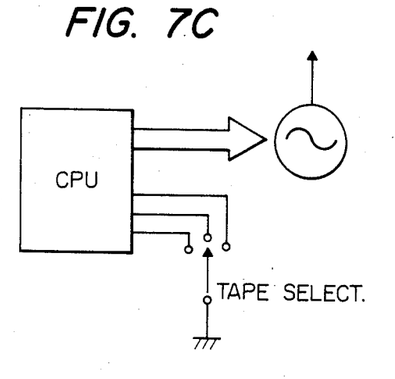
Figure 7D:
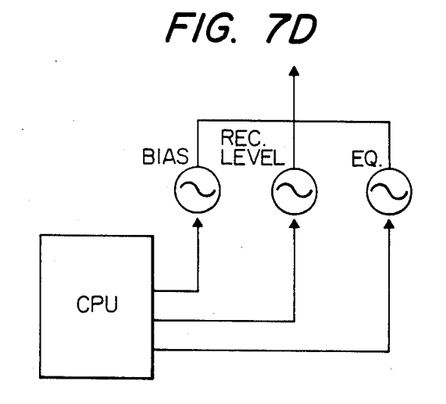
Figure 7E:
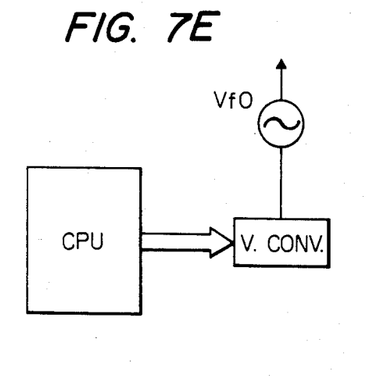
Figure 7F:
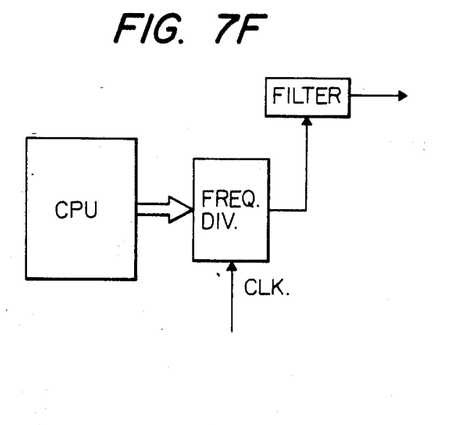

Referring now to the circuit diagrams of FIGS. 7A through 7F, various implementations of the switches 14 and 15 shown in FIG. 1 are depicted. In the arrangement of FIG. 7A, the setting of a tape selector switch is used to activate one of three low-frequency oscillators oscillating at frequencies $f_{L1}$, $f_{L2}$ and $f_{L3}$ so that the output frequency is determined in accordance with the type of tape being used. In the circuit of FIG. 7B, the output of the tape selector switch controls a voltage converter and voltage-controlled oscillator, with the output frequency $f_L$ of the voltage-controlled oscillator being thus selected in accordance with the type of tape being used. In FIG. 7C, the output of a tape selector switch is applied to a CPU, and the latter outputs data for selecting one of three different oscillators, as in the case of FIG. 7A, or outputs a control signal to a voltage-controlled oscillator, as in the case of FIG.-7B. In the arrangement of FIG. 7D, the output of a CPU is a control signal having a state indicative of the type of tape being used. This control signal is used to set a bias level, recording level and equalization level with three different respective oscillators. FIG. 7E is a modification of FIG. 7D, wherein a single voltage-controlled oscillator is controlled by a voltage converter, which is in turn controlled by the output of the CPU. Finally, as shown in FIG. 7F, the output frequency is controlled by the use of a frequency divider and filter, with the former being controlled by the output of the CPU. A clock pulse signal applied to the CPU may be used commonly for the frequency divider.

Although preferred embodiments have been described in which the variable low-frequency oscillator 2' is switched to produce three different oscillation frequencies, it may be controlled to oscillate at successively variable frequencies to adjust the MOL balance more finely.

Further, although embodiments have been described in which an optimum recording bias current, optimum recording level and optimum recording equalization characteristic are automatically set, the present invention can be applied to a magnetic recording and reproducing device in which only the optimum recording bias current is set.

Also, similar effects can be obtained in the case of detecting an over-bias level or an under-bias level, instead of peak level detection as described above. Specifically, the over-bias level is a level 1 dB below the peak level, and the frequency of the over-bias level is higher than that at the peak level. Similarly, the under-bias level is defined by a level 1 dB from the peak level, but the frequency of the under-bias level is lower than that of the peak level.

We claim:

1. A magnetic recording and reproducing device in which an optimum bias current is set, comprising:

means for varying a recording bias current at predetermined time intervals;

a variable low-frequency oscillator for supplying one of a plurality of low-frequency signals upon which said recording bias current is superposed to be magnetically recorded;

means for detecting a maximum value of a reproduced signal of said magnetically recorded signal and setting said recording bias current varying means to supply an optimum recording bias current corresponding to said maximum value of said reproduced signal; and means for switching said variable low-frequency oscillator to select one of said plurality of low-frequency signals as an optimum frequency for setting said recording bias current varying means, said switching means comprising means for switching said variable low-frequency oscillator to oscillate at an optimum frequency depending upon a type of magnetic medium employed.

2. The magnetic recording and reproducing device according to claim 1, further comprising optimum recording level setting means and means for switching a bias level and a recording level of signals recorded on said magnetic medium.

3. The magnetic recording and reproducing device according to claim 1, wherein said variable low-frequency oscillator comprises a plurality of low-frequency oscillators, said low-frequency oscillators having control inputs coupled to a tape selector switch whereby one of said low-frequency oscillators is activated by said tape selector switch in accordance with a type of magnetic medium employed.

4. The magnetic recording and reproducing device of claim 1, wherein said variable low-frequency oscillator comprises a voltage converter and a voltage-controlled oscillator having a control input coupled to an output of said voltage converter, said voltage converter having an input coupled to a tape selector switch whereby an output of said voltage converter to said voltage-controlled oscillator is determined in accordance with a type of magetic medium employed.

5. The magnetic recording and reproducing device according to claim 1, wherein said variable low-frequency oscillator comprises a voltage-controlled oscillator, and wherein said means for switching said variable low-frequency oscillator comprises a central processing unit having an input coupled to a tape selector switch, whereby said central processing unit controls said voltage-controlled oscillator in accordance with an output of said tape selector switch to oscillate at an optimum frequency depending upon a type of magnetic medium employed.

6. The magnetic recording and reproducing device according to claim 1, wherein said variable low-frequency oscillator comprises three separate oscillators, one for establishing a bias level, one for establishing a recording level, and one for establishing an equalization level, and wherein said means for switching said variable low-frequency oscillator comprises a central processing unit for applying a control signal to control inputs of said oscillators.

7. The magnetic recording and reproducing device of claim 1, wherein said variable low-frequency oscillator comprises a voltage converter and a voltage-controlled oscillator, an output of said voltage converter being coupled to a control input of said voltage-controlled oscillator, and wherein said switching means comprises a central processing unit for applying a control signal to a control input of said voltage converter 8. The magnetic recording and reproducing device according to claim 1, wherein said variable low-frequency oscillator comprises a frequency divider and a filter coupled to an output of said frequency divider, and wherein said switching means comprises a central processing unit for applying a control signal to said frequency divider.

* * * * *